(12) United States Patent
Serebryany et al.

(10) Patent No.: US 9,730,457 B2
(45) Date of Patent: Aug. 15, 2017

(54) METHOD AND APPARATUS FOR CUTTING DOUGH PRODUCTS HAVING HOLES FROM A DOUGH SHEET

(71) Applicant: 2168587 ONTARIO LTD., Downsview (CA)

(72) Inventors: Boris Serebryany, Toronto (CA); Randy Gerrard Allinson, Toronto (CA); Zinovy Ochakovsky, Thornhill (CA); Serguei Vialykh, Woodbridge (CA); Viktor Gontcharov, Toronto (CA)

(73) Assignee: 2168587 Ontario Ltd., Downsview, Ontario (CA)

( * ) Notice: Subject to any disclaimer, the term of this patent is extended or adjusted under 35 U.S.C. 154(b) by 189 days.

(21) Appl. No.: 14/140,196

(22) Filed: Dec. 24, 2013

(65) Prior Publication Data

US 2014/0113018 A1    Apr. 24, 2014

Related U.S. Application Data

(62) Division of application No. 13/027,822, filed on Feb. 15, 2011, now abandoned.

(51) Int. Cl.
*A21C 5/00* (2006.01)
*A21C 5/02* (2006.01)
(Continued)

(52) U.S. Cl.
CPC ............... *A21C 5/00* (2013.01); *A21C 11/10* (2013.01); *A21C 5/02* (2013.01); *A21C 5/08* (2013.01); *A21C 11/103* (2013.01); *A21C 11/106* (2013.01)

(58) Field of Classification Search
CPC .... A21C 5/00; A21C 5/02; A21C 5/08; A21C 11/10; A21C 11/103; A21C 11/106
(Continued)

(56) References Cited

U.S. PATENT DOCUMENTS 1,353,077 A * 9/1920 Smith ................... A21C 5/00
425/218
1,419,276 A * 6/1922 Lentz .................... A21C 11/08
83/124

(Continued)

OTHER PUBLICATIONS

Dabrowski, Edward. Canadian Intellectual Property Office Examiner's Report dated Jun. 29, 2011, in relation to Canadian Patent Application No. 2,736,184, 2 pages.
(Continued)

*Primary Examiner* — Seyed Masoud Malekzadeh

(57) ABSTRACT

A apparatus may be used to cut a dough product having a hole from a dough sheet. The stamping apparatus may have multiple cutting blades, depending from a platen, that are configured for cutting complementary open shapes, in phases, that together form a closed shape defining the dough product periphery. The stamping apparatus may also have a tubular cutting blade depending from the platen, configured to cut a closed shape defining the dough product hole, that is nested within one of the blades that is configured to cut an open shape. The tubular cutting blade may be retractable about a finger contained therewithin that remains in a fixed position in relation to the tubular cutting blade as the blade retracts. Air trapped within the tubular cutting blade, between the finger and a cutout dough piece that does not form part of the dough product, may become compressed during blade retraction. The compression may facilitate ejection of the cutout dough piece from the tubular cutting blade. The finger may be omitted in some embodiments.

16 Claims, 16 Drawing Sheets

(51) Int. Cl.
*A21C 11/10* (2006.01)
*A21C 5/08* (2006.01)

(58) Field of Classification Search
USPC .................. 425/281, 292, 295, 298, 299
See application file for complete search history.

(56) References Cited

U.S. PATENT DOCUMENTS

| | | | | | |
|---|---|---|---|---|---|
| 1,576,270 | A | * | 3/1926 | Ganski | A21C 5/00 83/111 |
| 1,650,682 | A | * | 11/1927 | Alltimes | A21C 11/10 425/299 |
| 2,137,811 | A | * | 11/1938 | Royal | A21C 11/10 30/130 |
| 2,241,890 | A | * | 5/1941 | Smith | A21C 5/00 83/112 |
| 2,346,242 | A | * | 4/1944 | Turner | A21C 11/10 30/301 |
| 2,547,118 | A | * | 4/1951 | Hart | A21C 11/10 425/193 |
| 2,589,907 | A | * | 3/1952 | Weidenmiller | A21C 11/10 83/124 |
| 2,589,908 | A | * | 3/1952 | Weidenmiller | A21C 11/10 425/299 |
| 2,595,305 | A | * | 5/1952 | Scott | A21C 3/02 83/124 |
| 2,799,929 | A | * | 7/1957 | Kurianski | A21C 11/106 30/301 |
| 3,248,980 | A | * | 5/1966 | Downing | A21C 11/002 294/65 |
| 3,604,366 | A | * | 9/1971 | Jarrett | A21C 11/14 425/162 |
| 3,864,829 | A | * | 2/1975 | Williams | B26F 1/44 30/130 |
| 4,719,117 | A | * | 1/1988 | Simelunas | A21C 5/00 426/502 |
| 5,641,527 | A | | 6/1997 | Burger | |
| 6,158,315 | A | * | 12/2000 | Nowotny | A21C 3/06 83/102 |
| 6,953,596 | B2 | * | 10/2005 | Maniak | A21C 11/10 426/503 |
| 2004/0040443 | A1 | * | 3/2004 | Errera | A21C 11/02 99/388 |
| 2004/0040446 | A1 | * | 3/2004 | Errera | A21C 11/02 99/388 |
| 2004/0050258 | A1 | * | 3/2004 | Maniak | A21C 11/10 99/353 |
| 2005/0132579 | A1 | * | 6/2005 | Sartori | A21C 11/106 30/299 |
| 2006/0182861 | A1 | * | 8/2006 | Arend | A21C 15/04 426/518 |
| 2010/0047431 | A1 | | 2/2010 | Toufayan | |
| 2011/0268840 | A1 | | 11/2011 | McDonnell et al. | |
| 2011/0283548 | A1 | * | 11/2011 | White | A21C 11/106 30/301 |
| 2014/0220169 | A1 | * | 8/2014 | Lion | A21C 11/04 425/296 |

OTHER PUBLICATIONS

Becker, Drew E. United States Patent and Trademark Office Office Action dated Dec. 31, 2012, in relation to U.S. Appl. No. 12/027,822, 7 pages.
Becker, Drew E. United States Patent and Trademark Office Office Action dated Feb. 21, 2013, in relation to U.S. Appl. No. 12/027,822, 9 pages.
Becker, Drew E. United States Patent and Trademark Office Office Action dated Jun. 27, 2013, in relation to U.S. Appl. No. 12/027,822, 9 pages.
Becker, Drew E. United States Patent and Trademark Office Office Action dated Oct. 8, 2013, in relation to U.S. Appl. No. 12/027,822, 3 pages.

* cited by examiner

METHOD AND APPARATUS FOR CUTTING DOUGH PRODUCTS HAVING HOLES FROM A DOUGH SHEET

CROSS REFERENCE TO RELATED APPLICATIONS

The present application is a division of application Ser. No. 13/027,822, filed Feb. 15, 2011, now abandoned which is hereby incorporated herein by reference in its entirety.

FIELD OF TECHNOLOGY

The present disclosure pertains to the cutting of dough products from a dough sheet. In particular, the present disclosure pertains to the cutting of dough products from a dough sheet, wherein each dough product has a hole. The dough may for example be artisan dough, such as ciabatta dough, and the dough products may be bagel-shaped dough rings with central holes.

BACKGROUND

In conventional bagel manufacturing, bagel dough is extruded and cut into chunks of predetermined size. The chunks are passed through equipment that rolls each chunk of dough into a "cigar" shape, folds the shaped dough back upon itself and joins the ends to form a dough ring. The equipment may comprise a belt, a mandrel and a sleeve for example. The dough ring may then be further processed and baked to create a bagel food product.

The above-described manner of bagel manufacture presumes the use of a bagel dough having a relatively firm consistency. Such dough may for example be less than fifty percent water.

Artisan dough, such as ciabatta dough, may be more than seventy-five percent water by weight. The consistency of artisan dough is much less firm than that of the bagel dough described above. For example, artisan dough may be considered to have a gummy, sticky or batter-like consistency. As such, the passing of artisan dough through the above-described type of bagel manufacturing equipment is unlikely to result in the desired dough ring. Rather, the equipment might cause the dough to stretch or tear. If that occurs, an undesirable clogging or gumming up of the equipment may result. It is perhaps for this reason that bagels made from artisan dough are relatively uncommon in the marketplace at the time of this writing.

BRIEF DESCRIPTION OF DRAWINGS

In the figures which illustrate at least one exemplary embodiment.

SUMMARY

Figure 1:
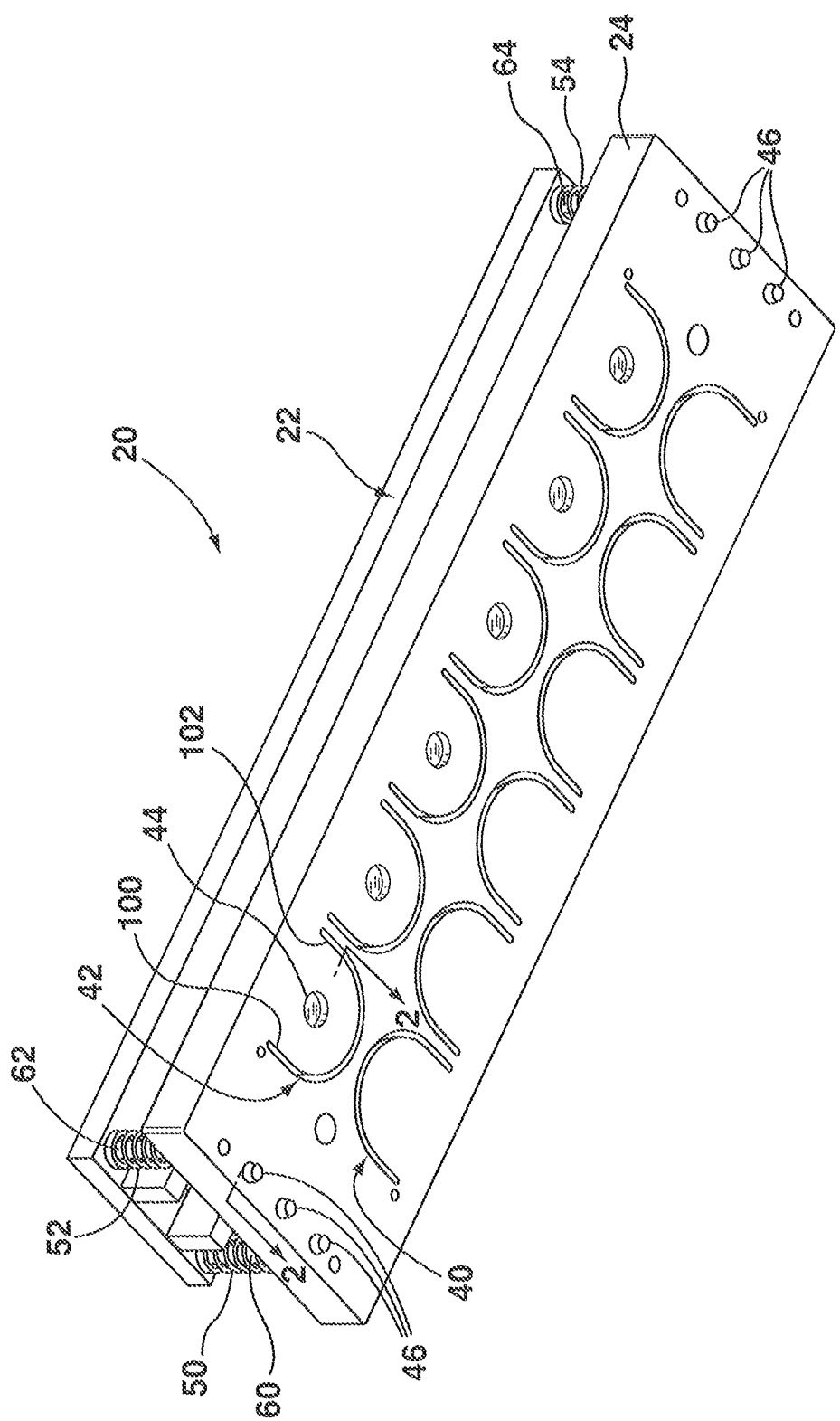
FIG. 1 is a perspective view of an exemplary stamping apparatus, with its cutting blades in a retracted position, viewed from below.

In one aspect of the present disclosure, there is provided a stamping apparatus for cutting, from a dough sheet, a dough product having a hole, the stamping apparatus comprising: a platen; first and second cutting blades depending from the platen, the first cutting blade configured to cut an open shape, the second cutting blade configured to cut an open shape that is complementary to the open shape cut by the first cutting blade, the first and second cutting blades for phased cutting of a closed shape defining a periphery of a dough product; a tubular cutting blade depending from the platen, the tubular cutting blade being nested either within the first cutting blade or within the second cutting blade, the tubular cutting blade for cutting a hole of the dough product; a stripping plate aligned with the platen, the platen being biased away from the stripping plate to a retracted position, the stripping plate having openings for passage of the first, second and tubular cutting blades therethrough when the bias is overcome; and a finger in fixed relation to the stripping plate, the finger projecting away from the platen and being contained within the tubular cutting blade, the finger for urging ejection of a cutout dough piece from the tubular cutting blade by a compression of air trapped within the tubular cutting blade between the finger and the cutout dough piece as the platen returns to the retracted position.

In another aspect of the present disclosure, there is provided a method of cutting, from a dough sheet, a dough product having a hole, the method comprising: cutting, through a dough sheet, a first open shape; subsequently cutting, through the dough sheet, a second open shape that is complementary to the first open shape, the first and second open shapes overlapping in the dough sheet so as to define a periphery of a dough product; simultaneously with either the cutting or the subsequent cutting, cutting, through the dough sheet, a hole of the dough product, the cutting of the hole being performed using a tubular cutting blade and resulting in a cutout dough piece that does not form part of the dough product; and after the cutting of the hole, retracting the tubular cutting blade about a finger that is contained within the tubular cutting blade, the retracting causing air trapped between the finger and the cutout dough piece within the tubular cutting blade to compress so as to urge ejection of the cutout dough piece from the tubular cutting blade.

In another aspect of the present disclosure, there is provided a stamping apparatus for cutting, from a dough sheet, a dough product having a hole, the stamping apparatus comprising: a platen; first and second cutting blades depending from the platen, the first cutting blade configured to cut an open shape, the second cutting blade configured to cut an open shape that is complementary to the open shape cut by the first cutting blade, the first and second cutting blades for phased cutting of a closed shape defining a periphery of a dough product; a tubular cutting blade depending from the platen, the tubular cutting blade being nested either within the first cutting blade or within the second cutting blade, the tubular cutting blade for cutting a hole of the dough product; and a stripping plate aligned with the platen, the platen being biased away from the stripping plate to a retracted position, the stripping plate having openings for passage of the first, second and tubular cutting blades therethrough when the bias is overcome.

DETAILED DESCRIPTION

In overview, to produce a dough product having a hole, such as a bagel-shaped dough ring having a central hole, from dough, such as artisan dough, the dough product may be cut from a sheet of the dough. A stamping apparatus may be used to cut the dough product from the dough sheet. The stamping apparatus may have multiple cutting blades configured to cut complementary open shapes, in a phased approach (i.e. in multiple cutting motions performed sequentially), that together form a closed shape defining the dough product periphery. The cutting of open shapes, rather than a closed shape, may reduce a tendency of the dough to stick to the cutting blades. The stamping apparatus may also have a tubular cutting blade that is configured to cut a closed shape defining the dough product hole. The use of a tubular cutting blade may advantageously provide a clean outline for the dough product hole. The tubular cutting blade may be nested within one of the blades that is configured to cut an open shape. The tubular cutting blade may be retractable about a finger contained therewithin that remains in a fixed position in relation to the tubular cutting blade as the blade retracts. Air trapped within the tubular cutting blade, between the finger and a cutout dough piece in the end of the blade, which dough piece does not form part of the product, may become compressed during blade retraction. The compression may facilitate ejection of the cutout dough piece from the tubular cutting blade, even in the case when the dough is gummy or sticky, e.g. due to a high water content (as may be the case for artisan dough). The ejection may advantageously occur without any need for the finger to come into contact with the cutout dough piece. This may reduce the risk of dough sticking to the finger. The finger is not necessarily present in all embodiments.

Referring to FIGS. 1-6, an exemplary stamping apparatus 20 for cutting dough products having holes is illustrated. The exemplary stamping apparatus 20 has six replicated sets of cutting blades for simultaneous cutting of six sets of shaped cuts into a dough sheet. The six sets of blades are perhaps best seen in FIG. 5, where they are referred to using reference numerals I-VI respectively. It will be appreciated that the number of sets of cutting blades may be greater or less than six in alternative embodiments of the stamping apparatus.

Referring to FIG. 1-4, the stamping apparatus 20 has a platen 22 from which the various cutting blades, described in detail below, depend, either directly or indirectly. The platen 22 and cutting blades may collectively be considered to constitute a cutting die. The platen 22 of the present embodiment comprises multiple rigid members joined together to form a unitary structure. This is perhaps best seen in FIG. 4.

Figure 4:
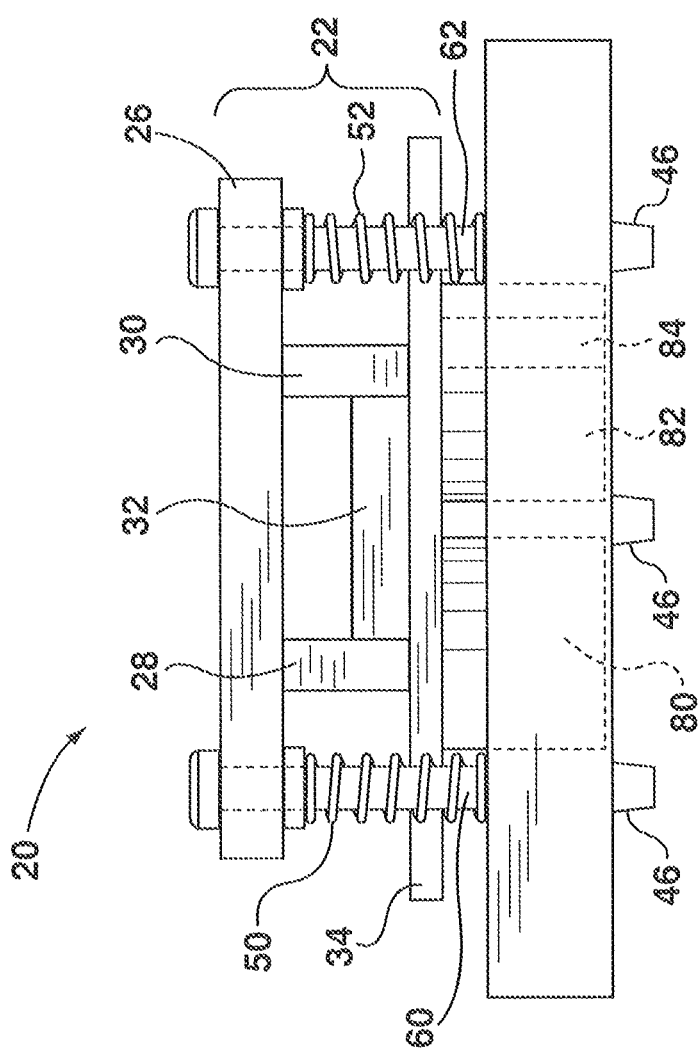

As illustrated in FIG. 4, the platen 22 comprises a horizontal upper member 26 sitting atop two cross members 28 and 30. The cross members 28 and 30 are spanned by a middle member 32. The cross members 28 and 30 and middle member 32 all sit atop a blade support member 34, to which the cutting blades are directly attached. For the avoidance of confusion, it is noted that the blade support member 34 may alternatively or generically be referred to as "the platen 22" in certain descriptions or drawings herein. In general, the role of platen 22 is to support or anchor the cutting blades which depend therefrom, so that the blades can all be made to move together, in a reciprocal motion, during stamping (i.e. cutting) operations. The structure and shape of the platen 22 may vary in other embodiments.

The stamping apparatus 20 also includes a stripping plate 24 (see, e.g., FIG. 1) aligned with the platen 22. In the present embodiment, the stripping plate is a flat rigid plate having openings through which the cutting blades pass. The openings, such as openings 40, 42 and 44 (FIG. 1), are shaped to match the shape of the cutting blades that pass through them. This is so that any dough that may stick to the cutting blades during cutting may be dislodged from the blades upon retraction of the cutting blades through the openings after cutting. The stripping plate 24 also has a plurality of feet 46 on its underside that are designed to engage a surface 48, which may be a conveyor belt for example, upon which a dough sheet lies during the dough cutting process (e.g. see FIG. 10).

Figure 2:
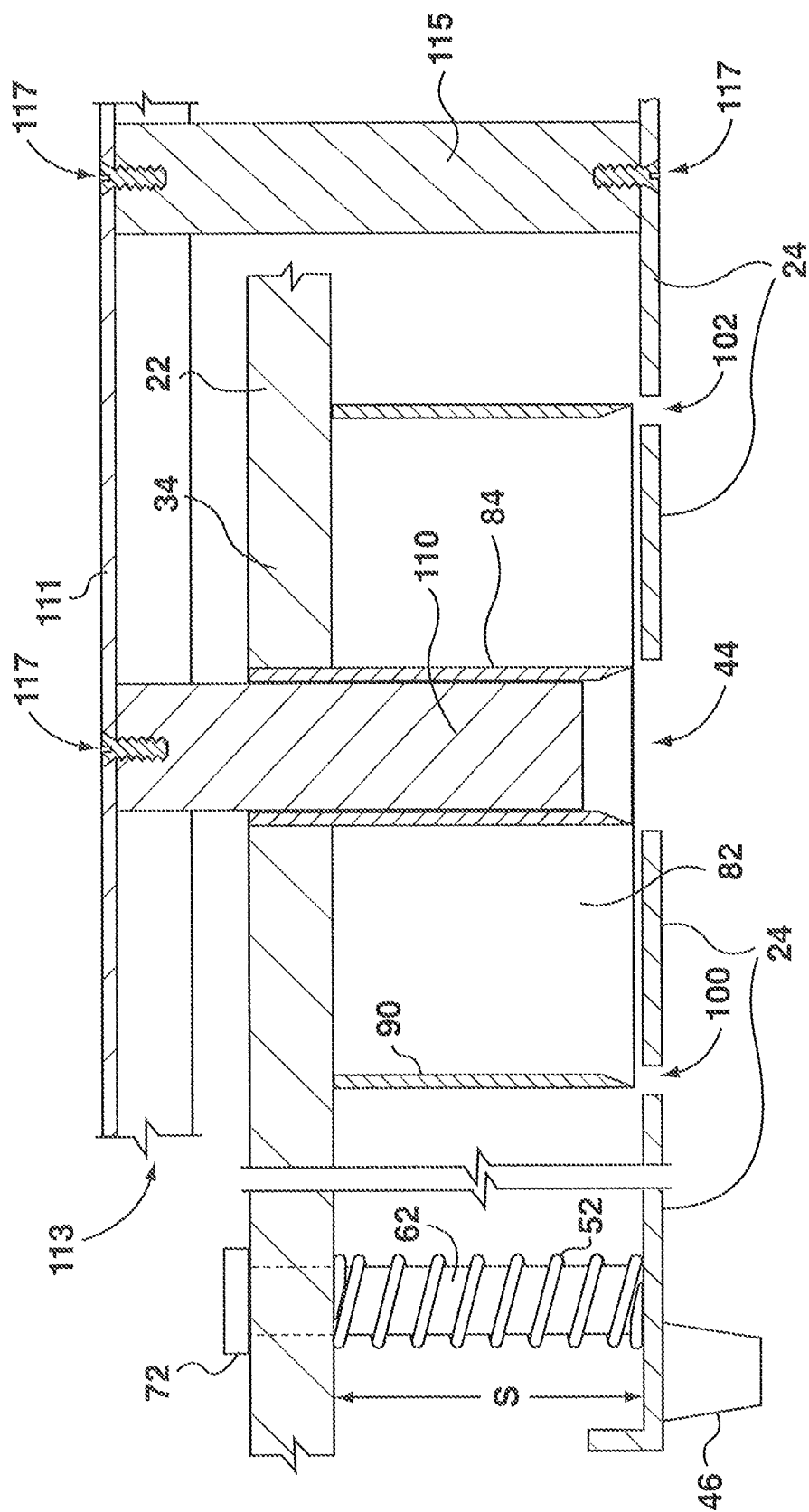
FIG. 2 is a cross-sectional view of a portion of the stamping apparatus of FIG. 1.

The platen 22 is biased away from the stripping plate to a set standoff S (see FIG. 2). In the present embodiment, this is achieved by way of four coil springs between the four corners of the platen 22 and the four corresponding corners of the stripping plate 24. Three of the springs 50, 52 and 54 are visible in FIG. 1. Each of the four coil springs receives (i.e. its coils surround) a respective post that is fixedly mounted to a respective corner of the stripping plate 24. For example, the springs 50, 52 and 54 of FIG. 1 receive posts 60, 62 and 64 respectively. Each post passes through a hole in a respective corner of the platen 22 and has a head portion that is wider than the remainder of the post. For example, posts 60, 62 and 64 have head portions 70, 72 and 74 respectively, perhaps best seen in FIG. 5. The springs bias the platen 22 away from the stripping plate to the set standoff S at which the upper surface of the platen 22 contacts the underside of the head portions of the posts (e.g. as in FIGS. 1 and 2). This may be referred to as the retracted position of the cutting blades or of the platen 22, because the cutting blades are retracted into the openings of the stripping plate 24 in this position. It will be appreciated that the bias of the springs is such that the platen 22 and blades will be in the retracted position when the stamping apparatus 20 is at rest.

When a downward force F that is sufficient to overcome the bias of the springs is applied to the platen 22 (e.g. as in FIGS. 6 and 7) while the feet 46 are resting upon a cutting surface 48 (as in FIG. 10), the cutting blades pass through the openings in the stripping plate 24 and thus protrude from the underside of the stamping apparatus 20. This may be referred to as the extended position of the cutting blades.

Figure 5:
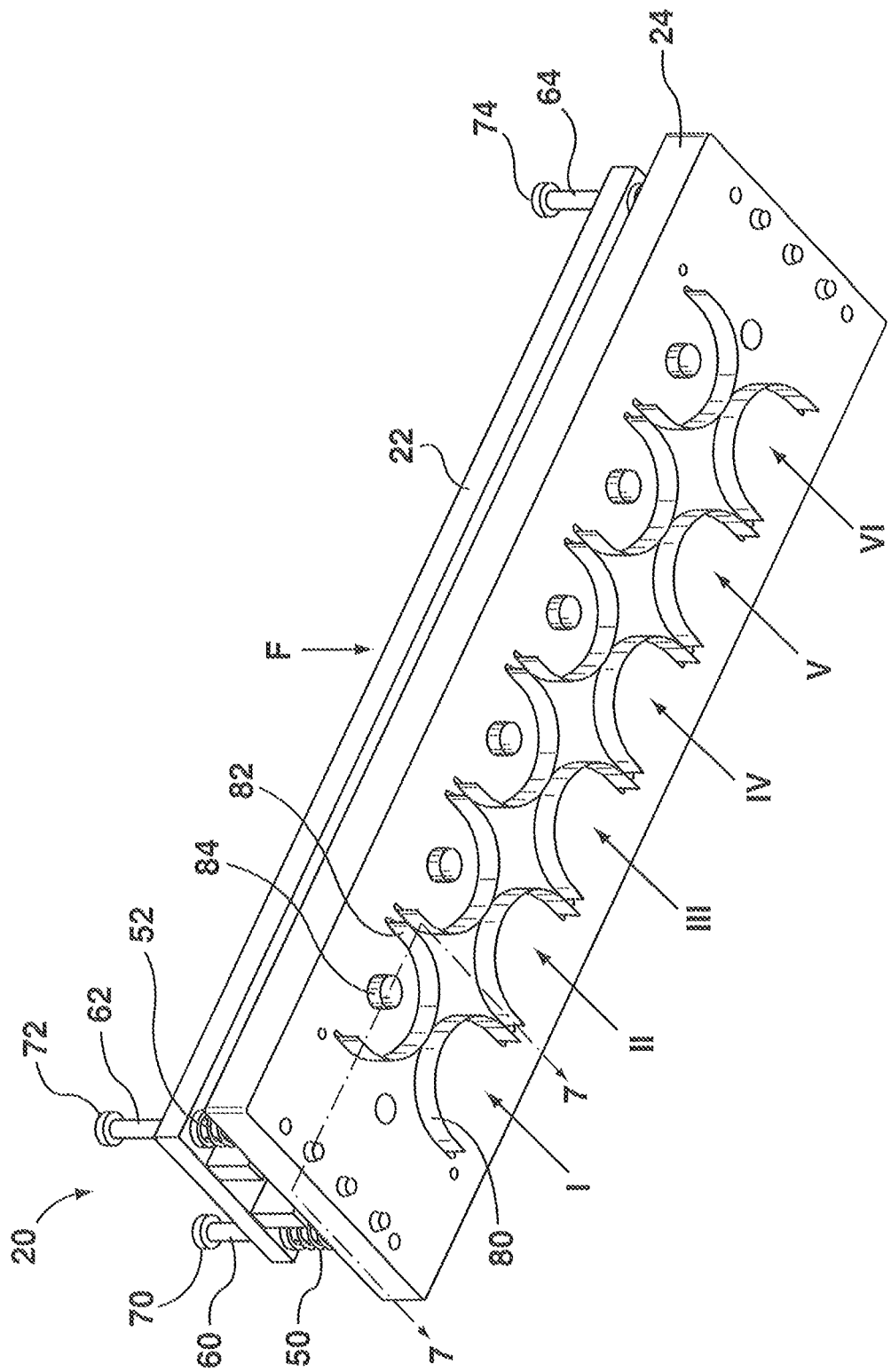
FIG. 5 is a perspective view of the stamping apparatus of FIG. 1, with its cutting blades in an extended position, viewed from below.

Referring to FIG. 5, an exemplary set of cutting blades, specifically set I of FIG. 5, includes a first cutting blade 80 configured to cut a first open shape and a second cutting blade 82 configured to cut a second open shape that is complementary to the first open shape. In the illustrated embodiment, the first open shape is a C shape (or reverse C shape, depending upon the perspective of the viewer), and the second open shape is a reverse C shape (or C shape, respectively). As will be appreciated, the two open shapes are for phased cutting of a closed shape that defines a periphery of a dough product. In the present example, the closed shape is the round periphery of a dough ring.

As is also shown in FIG. 5, a tubular cutting blade 84 is nested within the reverse C shape (or C shape, depending on perspective) of the second cutting blade 82. The tubular cutting blade 84, which is cylindrical in the present example, is for cutting the hole of the dough product, which in the present example is the circular central hole of the dough ring. Notably, the cutting blade 84 cuts the entire hole a single cutting motion. In this way, the cutting of the hole differs from the cutting of the dough product periphery, which is performed in a phased approach (i.e. using multiple cutting motions performed sequentially).

It will be appreciated that all three cutting blades 80, 82 and 84 of the first set I of cutting blades, and indeed all of the cutting blades of all six sets of blades I-VI, are in fixed relation to one another, such that the blades all extend and retract in unison.

A cross-sectional view of a portion of the stamping apparatus 20, including the first set I of cutting blades in the retracted position, is shown in FIG. 2. As illustrated, two opposing wall portions 90, 92 of the C shaped cutting blade 82 are positioned directly above opening portions 100, 102 of the corresponding C shaped opening 42 of stripping plate 24 through which the blade 82 passes as the cutting blades assume their extended position. Similarly, the tubular cutting blade 84 is positioned directly above opening 44 of the stripping plate 24 through which it passes as the cutting blades assume their extended position.

Figure 6:
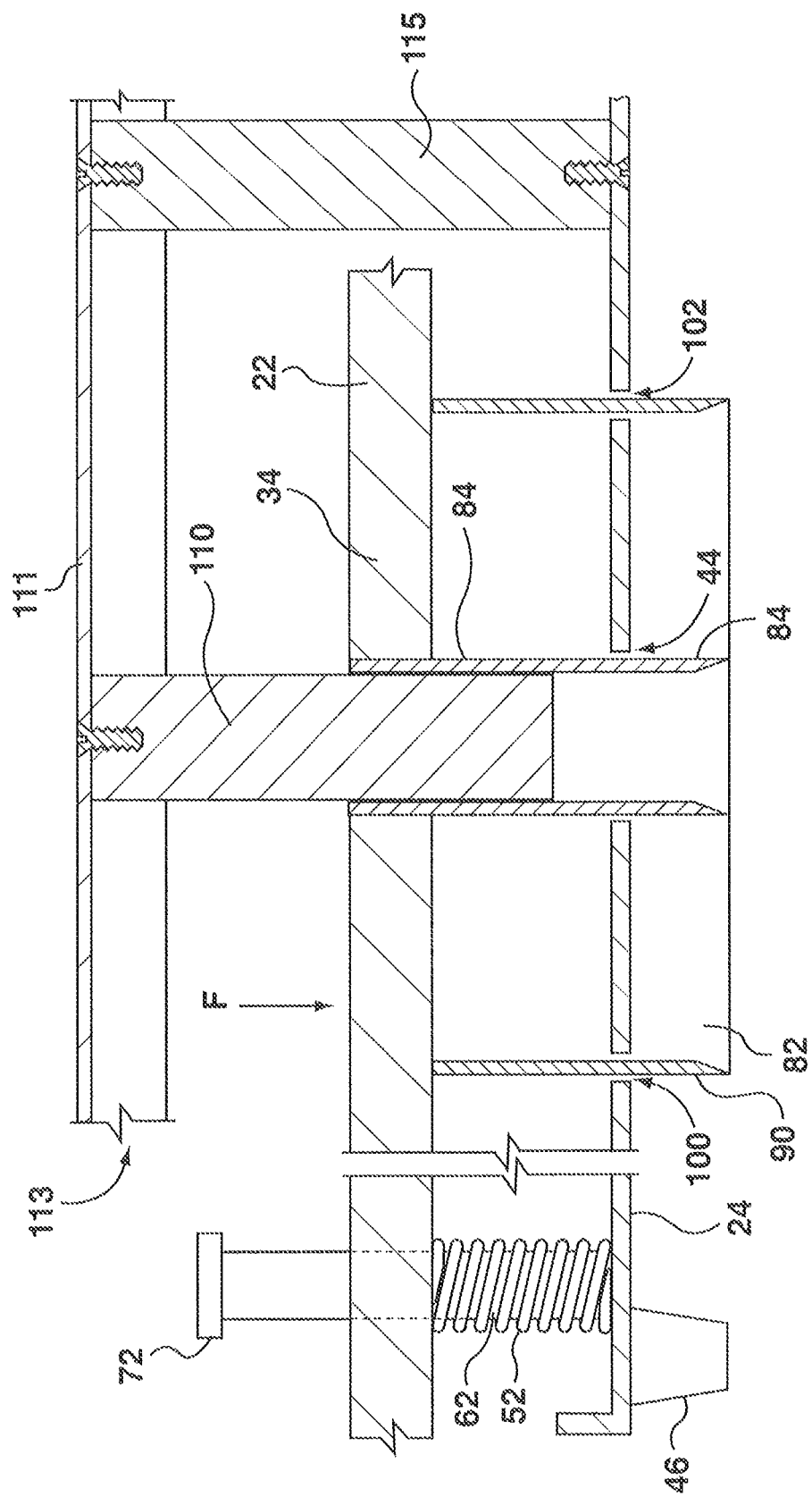
FIG. 6 a cross-sectional view of the portion of the stamping apparatus shown in FIG. 2 but with the cutting blades in an extended position.

As shown in FIG. 2, the tubular cutting blade 84 contains a finger 110, which takes the form of a closed cylinder in the present example, that projects away from the platen 22. The finger 110 is in fixed relation to the stripping plate 24. In the illustrated embodiment, the fixed relation is achieved by mounting an upper end of the finger 110 to the underside of the horizontal portion 111 of an angle bar 113, which angle bar 113 is in turn fixedly mounted to the stripping plate 24 by way of multiple posts 115 (only one of which posts 115 is visible in FIG. 2). The finger 110 and posts 115 may be made from a rigid plastic for example and may be mounted using screws 117 or other fasteners. As shown in FIG. 2, the finger 110 projects downwardly through an opening in the platen 22 and into tubular cutting blade 84. In view of the fixed relation between the stripping plate 24 and the finger 110, when the cutting blades of the stamping apparatus 20 are extended and retracted, the tubular cutting blade 84 slides downwardly and upwardly (respectively) around the finger 110. That is, when the tubular cutting blade 84 moves to its extended position as shown in FIG. 6, the finger 110 does not move with it. The finger 110 forms a substantially airtight seal with the interior of the tubular cutting blade 84.

Figure 3:
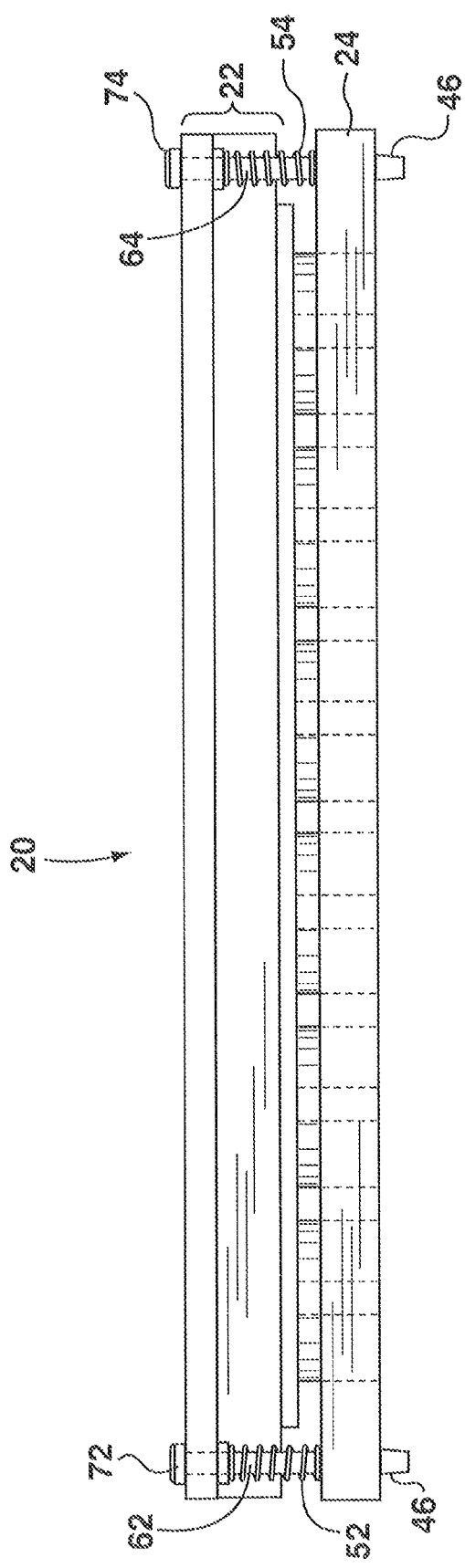
FIGS. 3 and 4 illustrate the stamping apparatus of FIG. 1 in elevation view from the front and from the side, respectively.

FIGS. 3 and 4 illustrate the stamping apparatus 20 in elevation view from the front and from the side, respectively, with the cutting blades in the retracted position. The angle bar 113 and posts 115 are omitted from these figures to avoid clutter.

Figure 7:
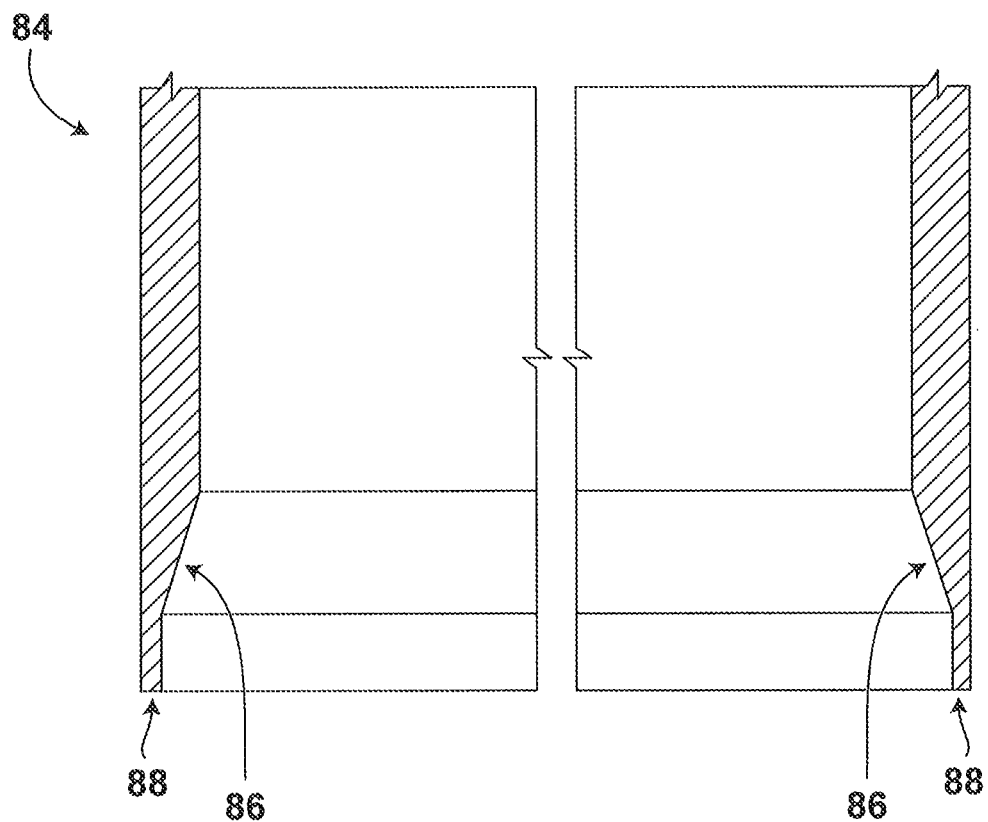
FIG. 7. is a cross-sectional view of an exemplary cutting edge of the tubular cutting blade of the stamping apparatus 20 of FIG. 1.

The cutting edge of tubular cutting blade 84 may be tapered on its inwardly facing side 86 only, as shown in FIG. 7, i.e. the cutting edge of blade 84 may being tapered on its inwardly facing side but not on its outwardly facing side. The degree of taper may vary from what is illustrated in FIG. 7. As well, the tip 88 of the tapered cutting edge may be blunt in order to reduce the risk that the blades will cut into the belt 48. Each of the C-shaped cutting blades (e.g. blades 80, 82) may also have the same sort of tapered, blunt cutting edge, for similar reasons.

Figure 8:
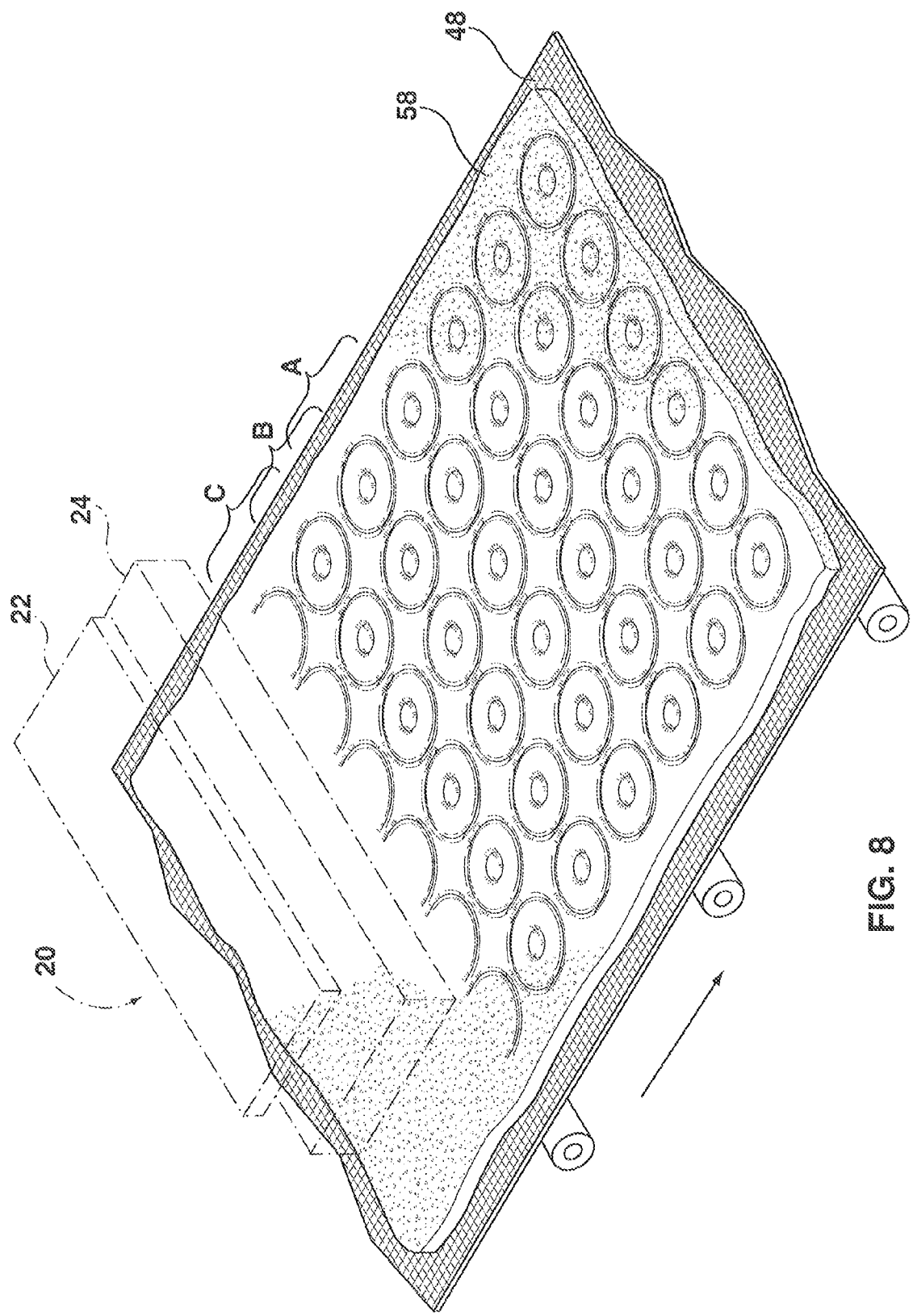
FIG. 8 is a perspective view of the stamping apparatus of FIG. 1 being used to cut dough products from a continuous dough sheet.
Figure 9A:
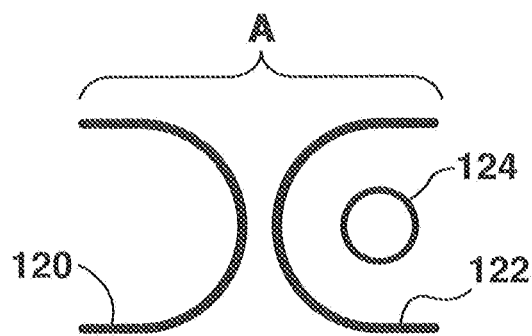
FIGS. 9A-9C are plan views of shaped cuts that are progressively made by a single set of blades of the stamping apparatus of FIG. 1.
Figure 9B:
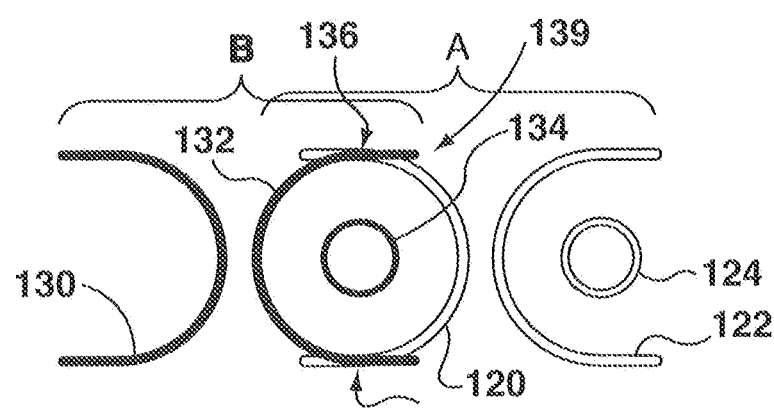
Figure 9C:
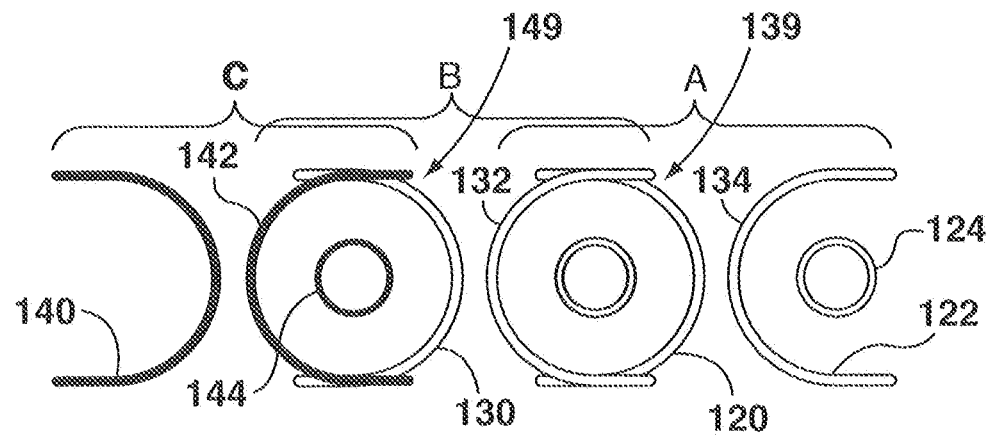
Figure 10:
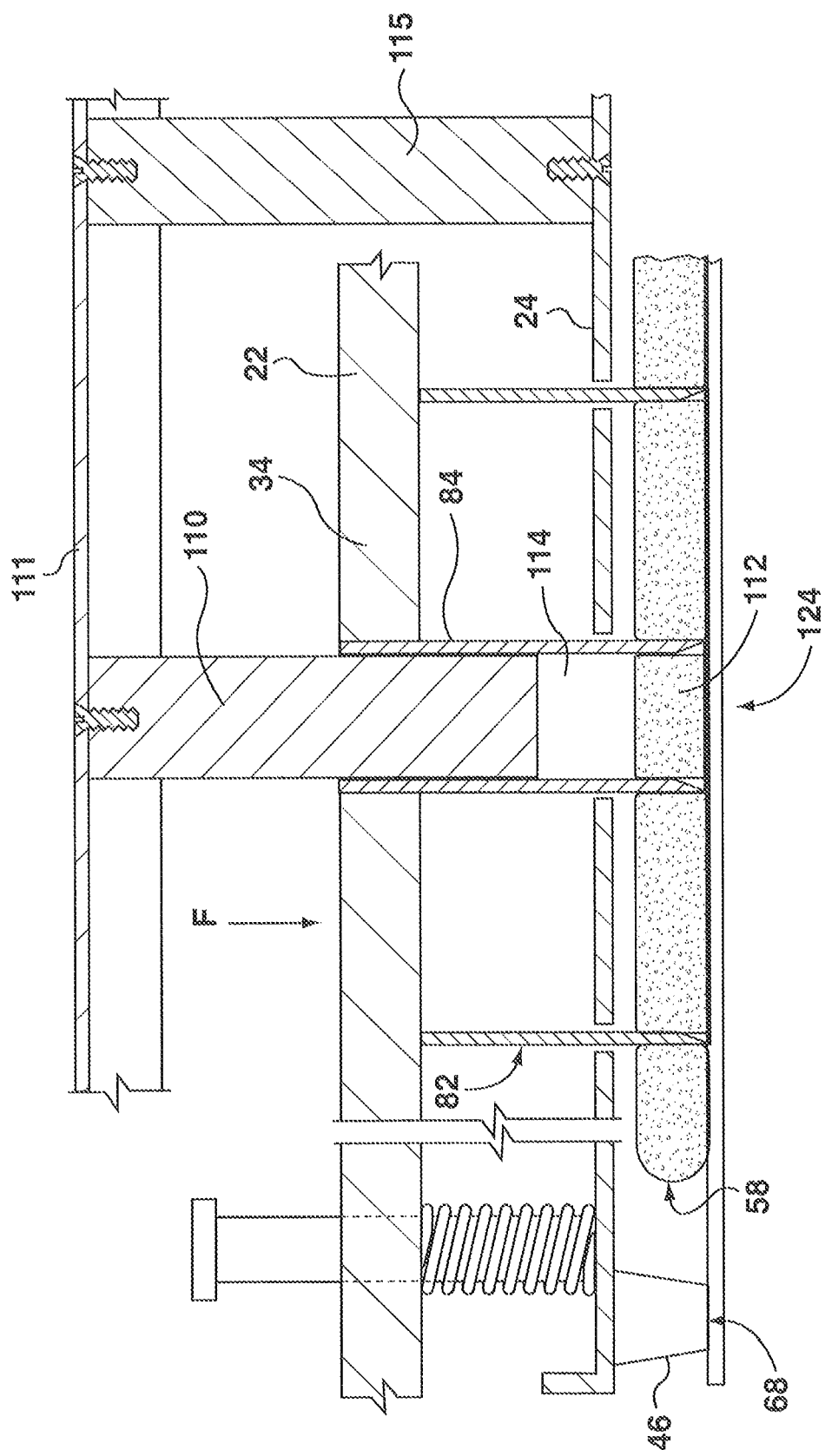
FIG. 10 is a cross-sectional view of the portion of the stamping apparatus shown in FIG. 6 that shows the cutting of dough.

Operation of the stamping apparatus 20 for cutting dough rings is illustrated in FIGS. 8, 9A-9C, 10 and 11A-11D. FIG. 8 is a perspective view showing a continuous dough sheet into which dough rings have being cut by the stamping apparatus 20. FIGS. 9A-9C are plan views of shaped cuts that are progressively made through the dough sheet by a single set of blades in order to form dough rings. FIG. 10 is a cross sectional view of a single set of blades in the fully extended position as the dough sheet is being cut. FIG. 10 is analogous to the cross sectional view of FIG. 6 but with the cutting of a portion of the dough sheet 58 being illustrated. FIGS. 11A-11D are side elevational views of four stages (respectively) in the motion of the stamping apparatus 20 during a single stamping operation.

Figure 11A:
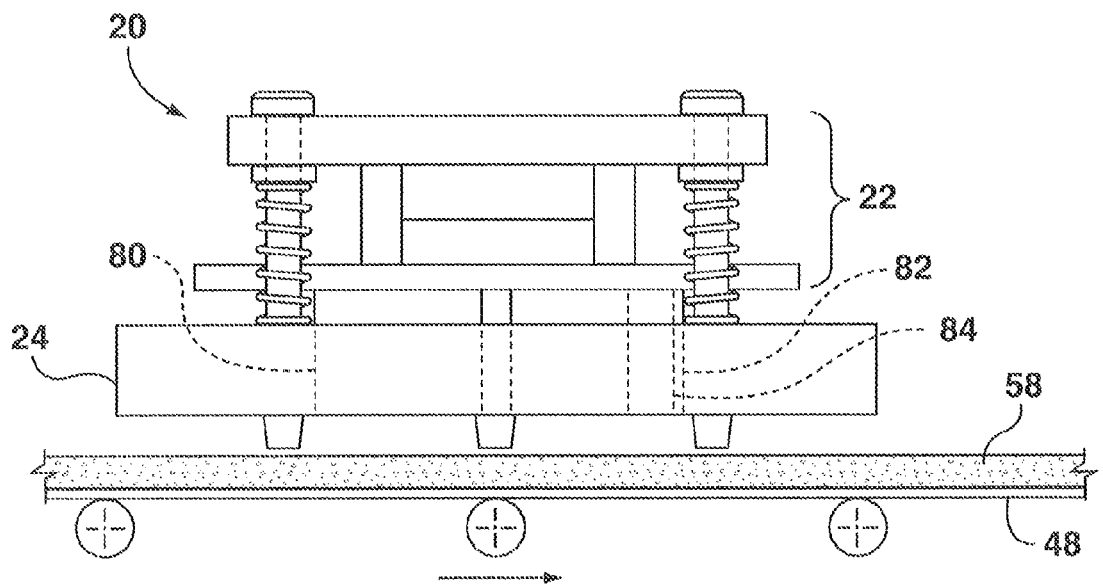
FIGS. 11A-11D are side elevational views of four stages in a single stamping operation performed by the stamping apparatus of FIG. 1.

Initially, the stamping apparatus 20 may be suspended over a conveyor belt 48 on which a continuous dough sheet 58 is being conveyed, as shown in FIG. 8 and in FIG. 11A. In particular, a walking beam (not illustrated) that is attached to the platen 22 may suspend the stamping apparatus 20 over the dough sheet 58 in a home position with the platen 22 and cutting blades being retracted.

Figure 11B:
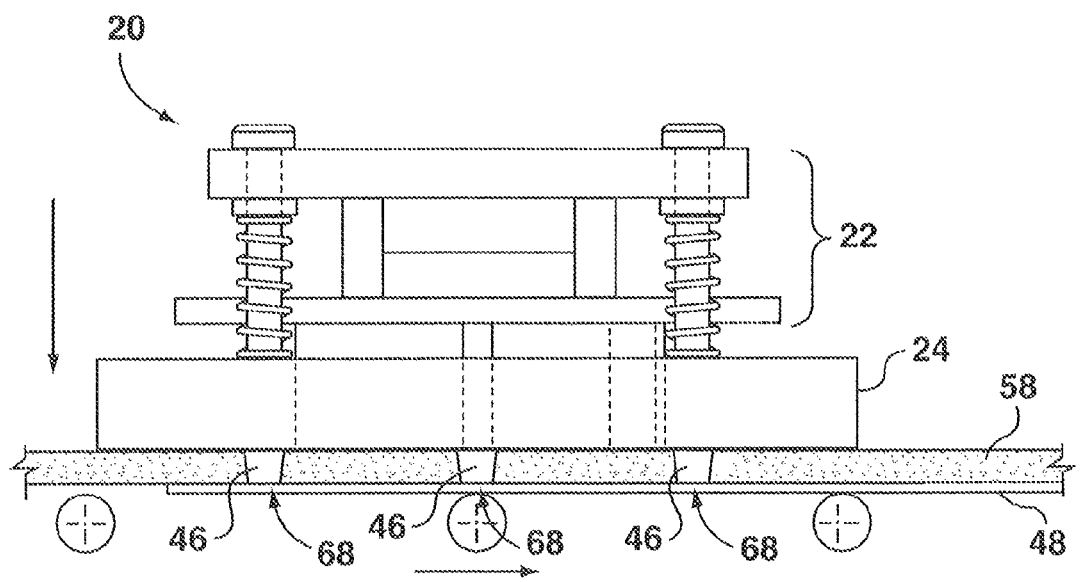

Thereafter, the stamping apparatus 20 is lowered until the feet 46 engage (i.e. come to rest upon) the conveyor belt 48 at positions 68 (FIG. 11B). It is noted that, at the moment the feet contact the conveyor belt 48, the cutting blades are still in their retracted position. Also at that moment, the walking beam commences moving along with the conveyor belt.

Figure 11C:
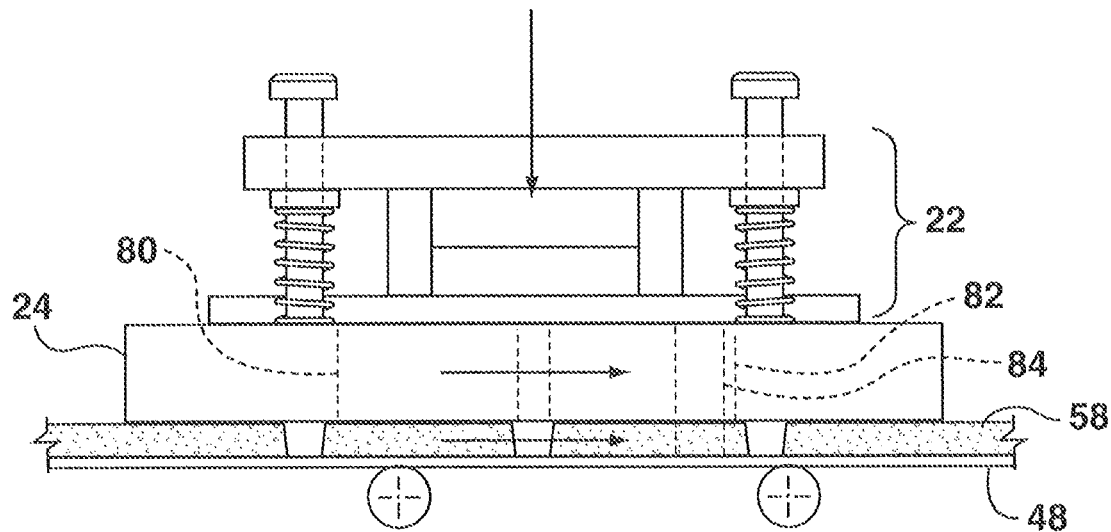

At this stage, with the stamping apparatus 20 tracking the motion of the conveyor belt 48, a downward force F that is sufficient to overcome the bias of the springs is applied to the platen 22 (FIG. 11C). This causes the cutting blades to extend through the openings in the stripping plate 24 and into and through the dough sheet 58. For a single set of cutting blades, such as set I of FIG. 5, this results in two complementary C shaped cuts 120, 122 (i.e. complementary open shapes) and one circular cut 124 (i.e. one closed shape), as indicated generally at A in FIG. 9A.

Referring to the cross sectional view of FIG. 10, it can be seen that the circular cut 124 made by tubular cutting blade 84 results in a cutout dough piece 112. Because the finger 110 does not move downwardly upon extension of the tubular cutting blade 84 (by virtue of being in fixed relation with the stripping plate 24), a closed pocket of air 114, trapped within the tubular cutting blade 84, forms between the cutout dough piece 112 and the finger 110.

At this stage, the downward force F is eased until the biasing springs begin to return the platen 22 and cutting blades to their retracted position. As the tubular cutting blade 84 retracts about the finger 110, the closed pocket of air 114 may become compressed. This compression tends to urge ejection of the cutout dough piece 112 from the tubular cutting blade 84. Advantageously, ejection may be achieved even when the dough is sticky or gummy (e.g. like artisan dough) and even when the cutout dough piece 112 is too small for gravity alone to result in ejection. Furthermore, the compressed air may permit ejection to be achieved with minimal or no contact between the finger 110 and the cutout dough piece 112, which may further reduce a risk of dough sticking to the stamping apparatus 20.

Figure 11D:
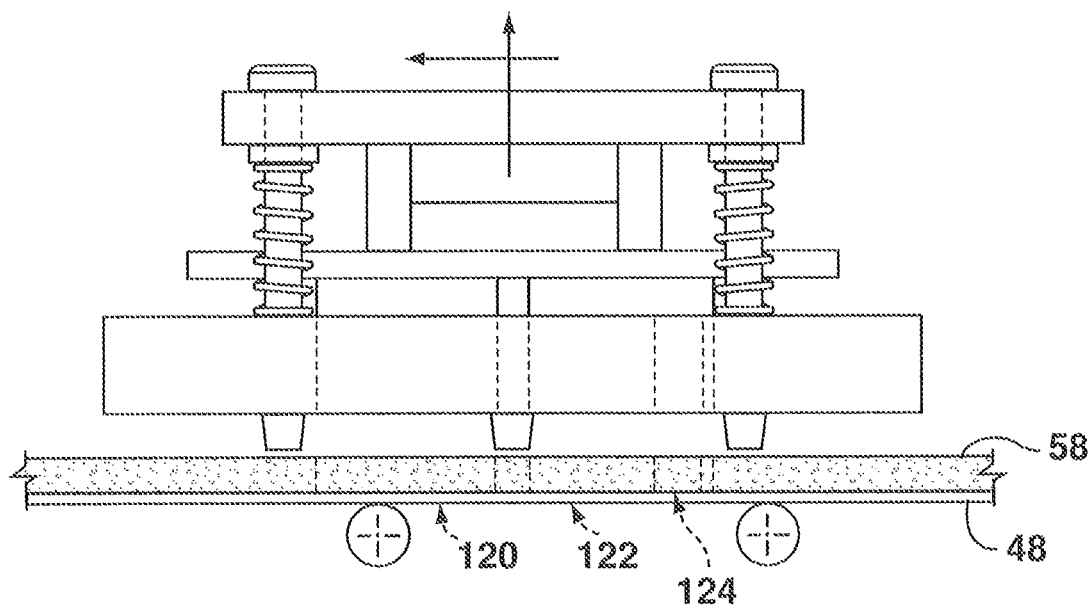
Figure 12:
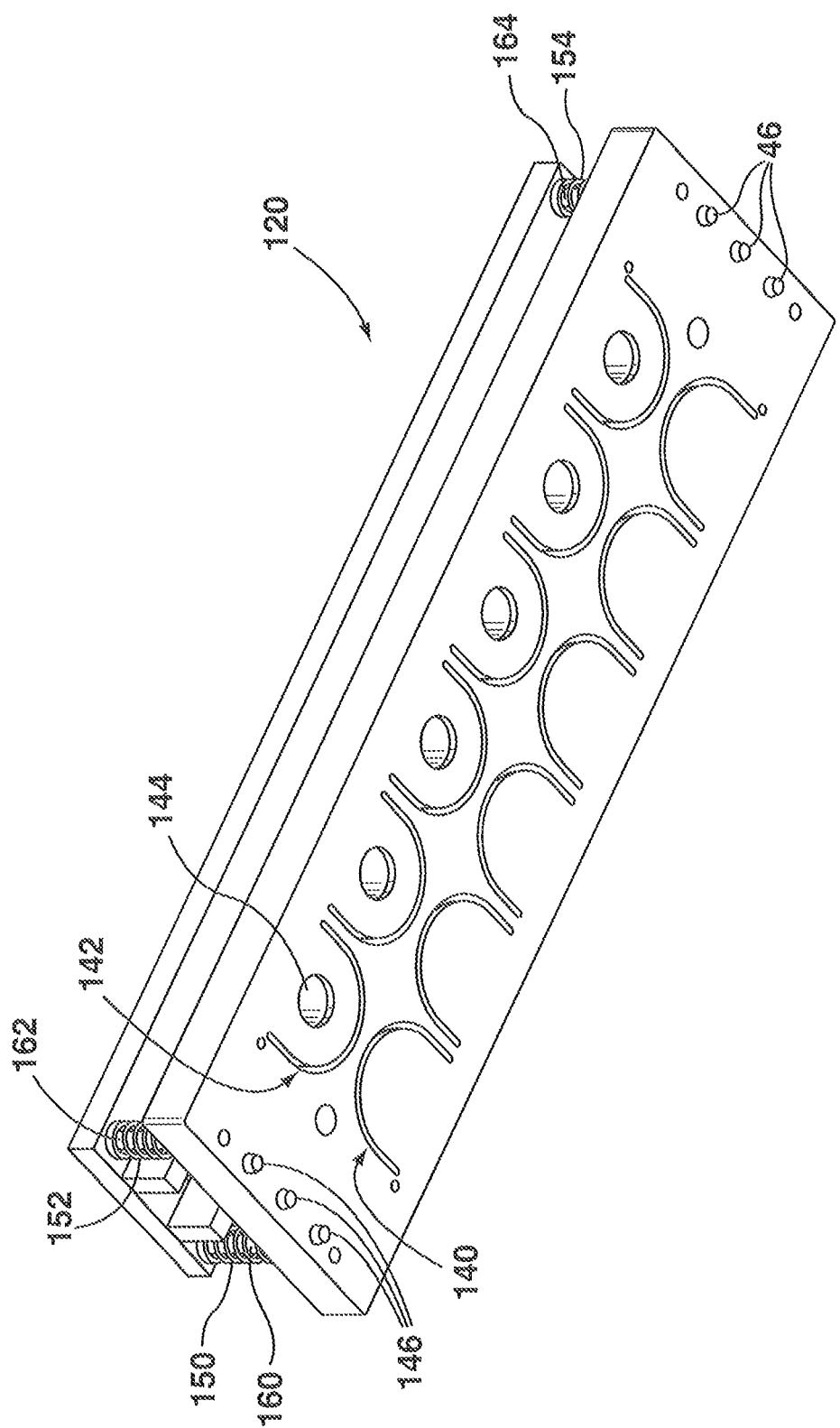
FIG. 12 is a perspective view of another exemplary stamping apparatus, with its cutting blades in a retracted position, viewed from below.

Ultimately, the walking beam raises the stamping apparatus 20 until the feet 46 lift away from the conveyor belt 48 (FIG. 11D). It then returns the stamping apparatus 20 its home position of FIG. 11A, i.e. translates the apparatus 20 in the opposite direction of conveyor belt motion, to account for the distance that the stamping apparatus 20 traveled while sitting on the conveyor belt 48. A single stamping operation is thus completed.

Thereafter, the stamping operation of FIGS. 11A-11D is repeated to cut an additional set of shapes into the dough sheet 58. In particular, and with reference to FIG. 9B, after the three shaped cuts 120, 122 and 124, indicated generally at A, have been translated away from the cutting blades by virtue of the conveying of the dough sheet 58 on conveyor belt 48, the three blades 80, 82 and 84 are once again used, this time to cut two new complementary C shapes 130, 132 and one new circular shape 134, as indicated generally at B in FIG. 9B. For clarity, the most recently cut shapes (i.e. the shapes that were cut in the most recent stamping operation) are shown in bold in FIG. 9B, as well as in FIGS. 9A and 9C. Notably, each C shape has a curved middle section and a pair of parallel linear end sections. By virtue of an overlap between the previously cut reverse C shape 120 and newly cut C shape 132, a complete periphery of a dough ring is defined. The completeness of the periphery may be ensured by intentionally intersecting the two end sections of the reverse C shape 120 with the respective two end sections of C shape 132, as shown at 136 and 138 in FIG. 9B. The intersecting may minimize the risk of undesirable uncut dough between the corresponding ends of the two open shapes 120 and 132. Moreover, the nesting of the circular shape 134 within the C shape 132 results in the desired centrally located dough ring hole.

Thus, at the conclusion of the second stamping operation, one dough ring, indicated generally at 139 in FIG. 9B, has been cut from the dough sheet 58. All of the cut shapes 120, 122, 124, 103, 132 and 134 are then translated away from the cutting blades by virtue of the conveying dough sheet 58 as the stamping apparatus 20 is again returned to its home position.

A further iteration of the stamping operation of FIGS. 11A-11D results in a new pair of complementary C shaped cuts 140, 142, a new circular cut 144, and as a result, a new dough ring 149, as shown in FIG. 9C at reference letter C.

As should now be appreciated, a series of dough rings may be cut in the manner described above. The same strategy may be used for cutting dough products having virtually any peripheral shape and virtually any shape of hole, whether located centrally in the dough product or otherwise.

It should be appreciated that a rationale for using a combination of cutting blades having both open and closed shapes for cutting dough products having holes from a dough sheet may be to achieve a desirable compromise between reduced likelihood of dough sticking to the cutting blades, successful cutting of the dough without any uncut dough bridging the dough product and the cutout dough piece or the surrounding rework dough (i.e. excess dough between dough products), and maximizing the aesthetic appeal of the dough product. On one hand, the open shaped blades tend to reduce a risk of dough sticking to, or lifting away with, the blades, e.g. in comparison to the use of closed shape blades. A trade-off of using open shaped blades, however, may be that, if the complementary open shaped cuts are not aligned properly, the desired closed shape may be incompletely cut. That is, some dough between the ends of the open shaped cuts may undesirably remain intact, which may compromise separation of dough products from rework. To address this issue, corresponding ends of the complementary open shaped cuts may be made to intersect, as described above. This intersection may cause some portion of each cut to extend into rework dough, which is acceptable because the consumer will not see the rework dough. However, if the same approach were used to cut the dough product hole, any intersecting of the ends of complementary open shaped cuts may undesirably cut into the dough product itself. This may be considered aesthetically displeasing. For this reason, a closed shape blade is used. While this may increase the risk of dough sticking to the blade, such risk may be minimized, e.g., by the compressing of air trapped between the end of a finger and the closed shaped blade to facilitate cutout dough piece ejection. Alternatively, in some embodiments the weight of the dough may be sufficient to avoid dough sticking to the tubular blade even without any finger.

As will be appreciated by those skilled in the art, various other modifications can be made to the above-described embodiment. For example, it is not necessarily required for the complementary, open shaped cutting blades to have a C shape and a reverse C shape. Any complementary open shapes, whether having straight lines or curved lines, may be used. Furthermore, the word "tubular" should not be interpreted as implying a round cross section of the tubular cutting blade. In some embodiments, the tubular cutting blade cross section may have another closed shape, such as oval or even polygonal (e.g. square). In such cases, if a finger is used within the tubular cutting blade, it may have a similar cross sectional shape, e.g. to promote a substantially airtight seal between the finger and the blade.

The tubular cutting blade may be nested in either one of the two open shaped cutting blades. It is not necessarily true that the hole is cut at the same time that the outer periphery of the dough product is completed.

For some dough products, the size of the desired cutout dough piece may be sufficiently large for gravity alone to suffice in promoting ejection of the dough piece from the end of tubular cutting blade after cutting. In such cases, the use of a finger within the tubular cutting blade for promoting ejection of dough piece through the compressing of trapped air may be unnecessary. An alternative embodiment lacking a finger is illustrated in FIGS. 12-15, which are analogous to FIGS. 1, 2, 5 and 6 of the earlier described embodiment and in which analogous features are numbered using reference numerals that are offset by one hundred from the reference numerals of FIGS. 1, 2, 5 and 6.

Referring to FIGS. 12-15, it can be seen that the stamping apparatus 120 has a platen 122 from which the various cutting blades depend either directly or indirectly. As with the earlier described embodiment, the blade support member 134 of the present embodiment may alternatively or generically be referred to as "the platen 122" herein. The structure and shape of the platen 122 may vary in other embodiments.

The stamping apparatus 120 also includes a stripping plate 124 (see, e.g., FIG. 12) aligned with the platen 122. In the present embodiment, the stripping plate is a flat rigid plate having openings, such as openings 140, 142 and 144 (FIG. 12), through which the cutting blades pass. The stripping plate 124 also has a plurality of feet 146 on its underside.

Figure 13:
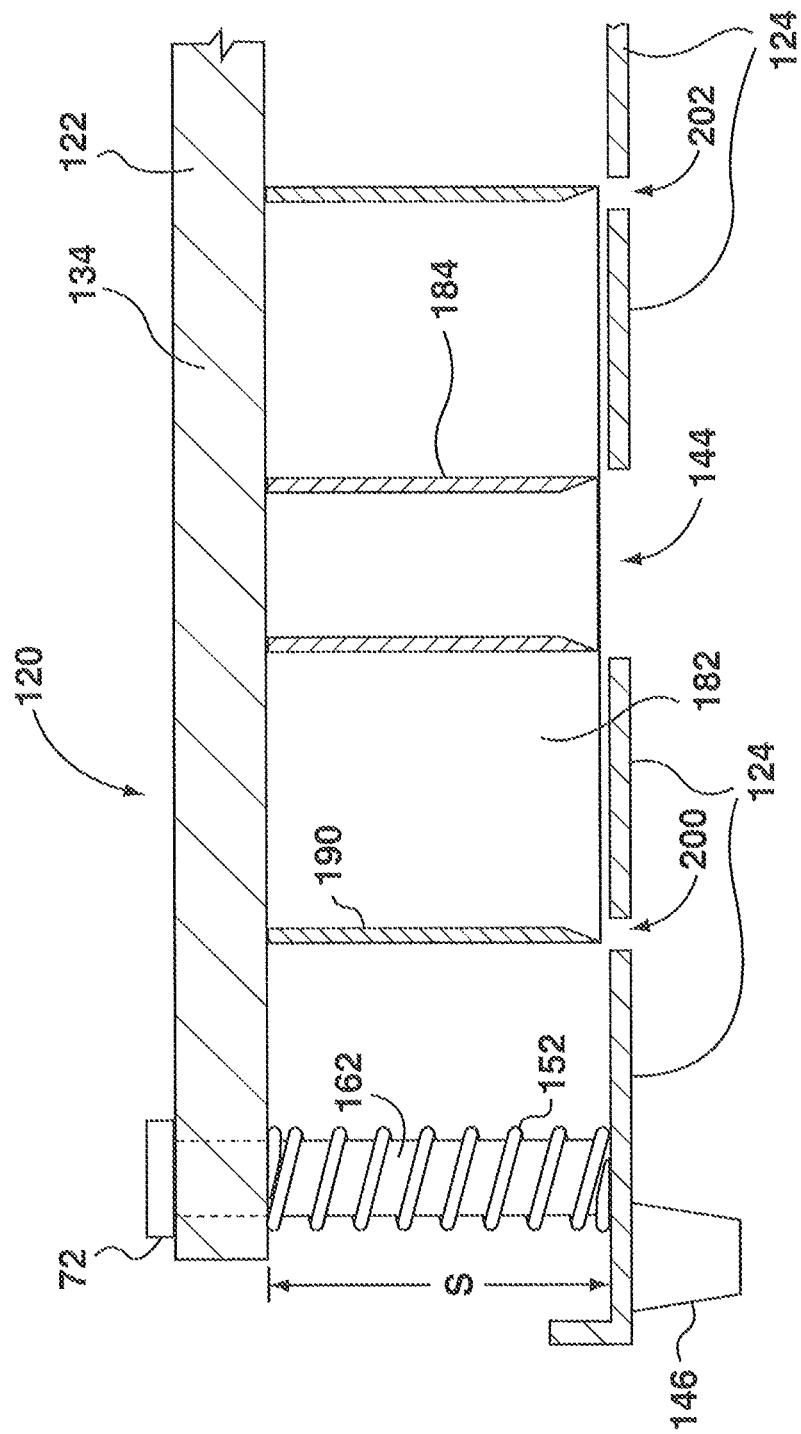
FIG. 13 is a cross-sectional view of a portion of the stamping apparatus of FIG. 12.
Figure 14:
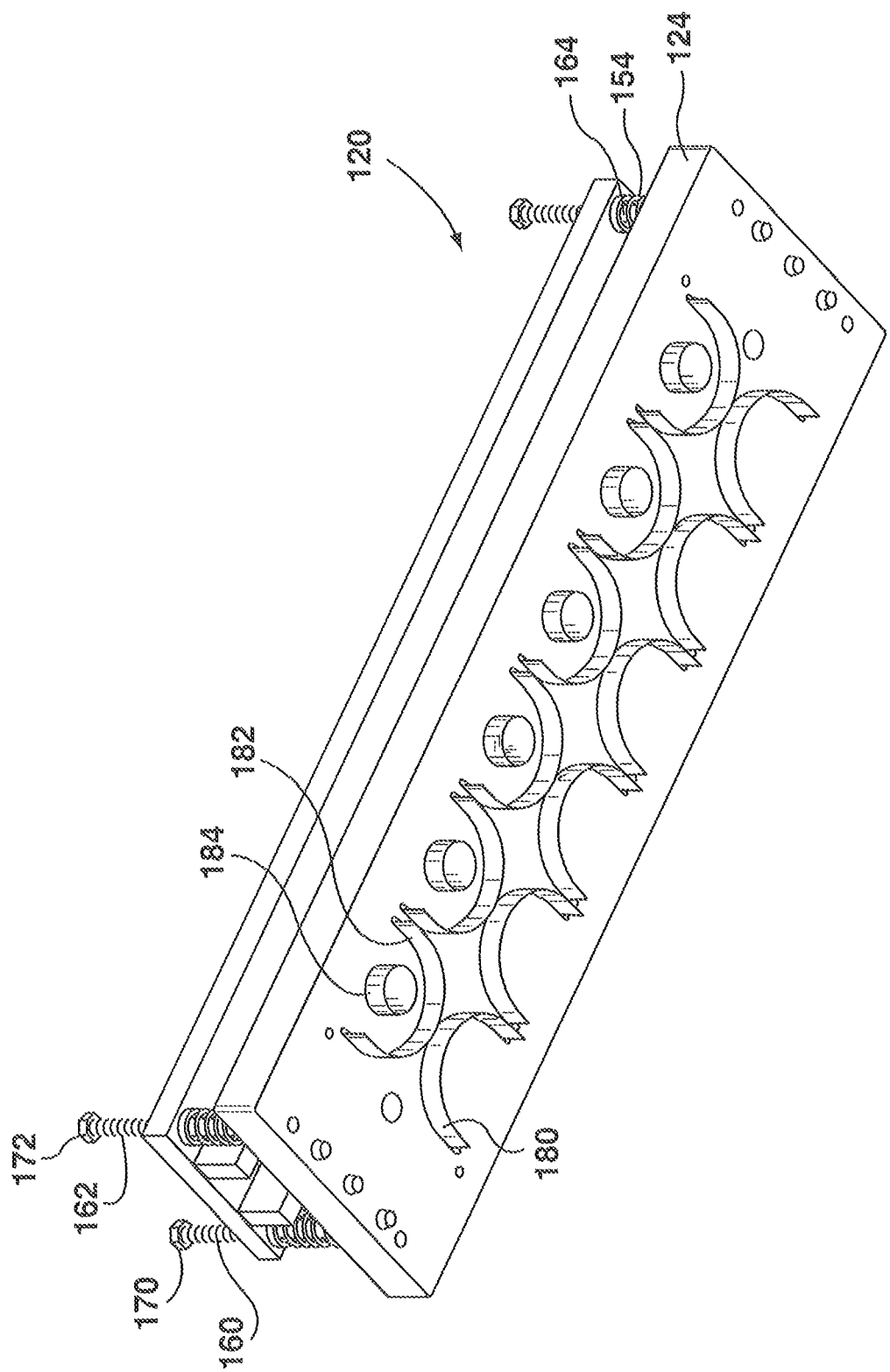
FIG. 14 is a perspective view of the stamping apparatus of FIG. 12, with its cutting blades in an extended position, viewed from below.
Figure 15:
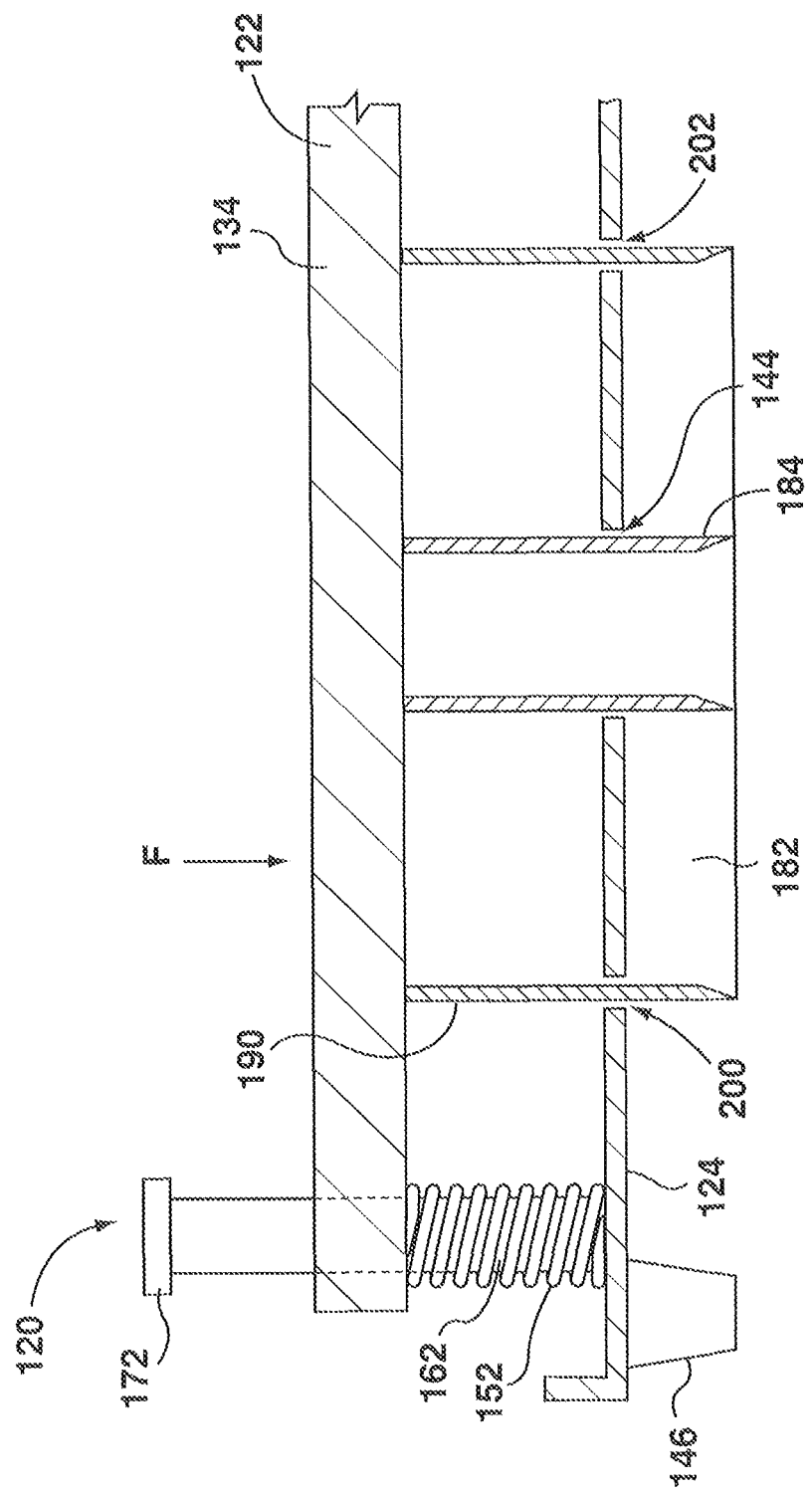
FIG. 15 a cross-sectional view of the portion of the stamping apparatus shown in FIG. 13 but with the cutting blades in an extended position.

The platen 122 is biased away from the stripping plate to a set standoff S (see FIG. 13). In the present embodiment, this is achieved by way of four coil springs between the four corners of the platen 122 and the four corresponding corners of the stripping plate 124. Three of the springs 150, 152 and 154 are visible in FIG. 12. The springs 150, 152 and 154 of FIG. 12 receive posts 160, 162 and 164 respectively. The springs 150, 152 and 154 receive posts 160, 162 and 164 respectively. Each post passes through a hole in a respective corner of the platen 122 and has a head portion that is wider than the remainder of the post. For example, posts 160, 162 and 164 have head portions 170, 172 and 174 respectively, perhaps best seen in FIG. 15.

A cross-sectional view of a portion of the stamping apparatus 120, including a single set of cutting blades in a retracted position, is shown in FIG. 13. As illustrated, two opposing wall portions 190, 192 of the C shaped cutting blade 182 are positioned directly above opening portions 200, 202 of the corresponding C shaped opening 142 of stripping plate 124 through which the blade 182 passes as the cutting blades assume their extended position. Similarly, the tubular cutting blade 184 is positioned directly above opening 144 of the stripping plate 124 through which it passes as the cutting blades assume their extended position.

Operation of the embodiment of FIGS. 12-15 is similar to that described hereinabove and illustrated herein for the embodiment having a finger 110, with the exception that the cutout dough piece that is cut out by the tubular cutting blade 184 falls out of the open cutting end of the blade 184 through the operation of gravity rather than being ejected with the assistance of compressed air between a finger 110 and the dough piece.

It is noted that, in the embodiment of FIGS. 12-15, the tubular cutting blade may have a frustoconical shape, with the distal cutting edge having a larger footprint than an opposing end that is more proximate to the platen. This shape may reduce the likelihood of dough sticking to the tubular cutting blade in the absence of a finger. The use of a frustoconically shaped tubular blade is not required however.

In the case where a finger is used within the tubular cutting blade to promote ejection of the dough piece from the tubular cutting blade through compressing of trapped air, an airtight or substantially airtight fitting between the finger and tubular cutting blade may be achieved in various ways, e.g. using resilient gaskets, O-rings or the like.

Although the biasing means in stamping apparatuses 20 or 120 are coil springs, any other suitable type of biasing means, such as other types of springs (e.g. leaf springs), resilient material, or the like, may be used.

Other modifications may be apparent to those skilled in the art and, therefore, the invention is defined in the claims.

What is claimed is:

1. A stamping apparatus for cutting, from a dough sheet, a dough product having a hole, the stamping apparatus comprising:
   a platen;
   first and second cutting blades depending from the platen, the first cutting blade configured to cut a first open shape, the second cutting blade configured to cut a second open shape, the first and second cutting blades for phased cutting of a closed shape defining a periphery of the dough product;
   a tubular cutting blade depending from the platen, the tubular cutting blade being nested either within the first cutting blade or within the second cutting blade, the tubular cutting blade for cutting a hole of the dough product;
   a stripping plate aligned with the platen, the platen having a retracted position retracted away from the stripping plate, the stripping plate having openings for passage of the first, second and tubular cutting blades therethrough when the platen moves from the retracted position to an extended position; and
   a finger in fixed relation to the stripping plate, the finger projecting away from the platen and being contained within the tubular cutting blade and configured so as to form a substantially airtight seal with an interior of the tubular cutting blade, wherein the finger urges ejection of a cutout dough piece from the tubular cutting blade by a compression of air trapped within the tubular cutting blade between the finger and the cutout dough piece as the tubular cutting blade returns with the platen to the retracted position.

2. The stamping apparatus of claim 1 wherein the first cutting blade has a C shape for cutting the first open shape and the second cutting blade has a reversed C shape for cutting the second open shape.

3. The stamping apparatus of claim 1 wherein the tubular cutting blade is cylindrical and wherein the finger comprises a closed cylinder.

4. The stamping apparatus of claim 1 wherein the tubular cutting blade has a cutting edge that is tapered only on an inwardly facing side of the tubular cutting blade.

5. The stamping apparatus of claim 4 wherein a tip of the tapered cutting edge is blunt.

6. The stamping apparatus of claim 1 wherein the stripping plate has feet on a side opposite the platen, the feet for engaging a surface upon which the dough sheet rests.

7. The stamping apparatus of claim 1 wherein the dough sheet comprises artisan dough and wherein the dough product is a bagel-shaped dough product.

8. A stamping apparatus for cutting, from a dough sheet, a dough product having a hole, the stamping apparatus comprising:
   a platen;
   first and second cutting blades depending from the platen, the first cutting blade configured to cut a first open shape, the second cutting blade configured to cut a second open shape, the first and second open shapes each comprising a curved middle section and a pair of parallel linear end sections, the stamping apparatus configured so as to provide a phased cutting operation wherein the first cutting blade cuts a first cut shape and the second cutting blade cuts a second cut shape, such that the pair of parallel linear end sections of each of the first and second cut shapes at least partially overlap so as to define a closed shape defining a periphery of the dough product;
   a tubular cutting blade depending from the platen, the tubular cutting blade being nested either within the first cutting blade or within the second cutting blade, the tubular cutting blade for cutting a hole of the dough product; and
   a stripping plate aligned with the platen, wherein the platen is biased away from the stripping plate to a retracted position, the stripping plate having openings for passage of the first, second and tubular cutting blades therethrough when the bias is overcome and the platen moves from the retracted position to an extended position.

9. The stamping apparatus of claim 8 wherein the first cutting blade has a C shape for cutting the first open shape and the second cutting blade has a reversed C shape for cutting the second open shape.

10. The stamping apparatus of claim 8 wherein the tubular cutting blade is cylindrical.

11. The stamping apparatus of claim 8 wherein the tubular cutting blade has a cutting edge that is tapered only on an inwardly facing side of the tubular cutting blade.

12. The stamping apparatus of claim 11 wherein a tip of the tapered cutting edge is blunt.

13. The stamping apparatus of claim 8 wherein the stripping plate has feet on a side opposite the platen, the feet for engaging a surface upon which the dough sheet rests.

14. The stamping apparatus of claim 8 wherein the dough sheet comprises artisan dough and wherein the dough product is a bagel-shaped dough product.

15. The stamping apparatus of claim 1 wherein the platen is biased away from the stripping plate to a retracted position.

16. The stamping apparatus of claim 1 wherein the finger has a flat lower surface.

* * * * *